United States Patent
Casper et al.

(10) Patent No.: US 7,190,931 B2
(45) Date of Patent: Mar. 13, 2007

(54) RECEIVER CALIBRATION APPARATUS, METHOD, AND SYSTEM

(75) Inventors: Bryan K. Casper, Hillsboro, OR (US); Aaron K. Martin, Hillsboro, OR (US); James E. Jaussi, Hillsboro, OR (US); Stephen R. Mooney, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 532 days.

(21) Appl. No.: 10/674,175

(22) Filed: Sep. 29, 2003

(65) Prior Publication Data

US 2005/0070229 A1 Mar. 31, 2005

(51) Int. Cl.
*H04B 17/00* (2006.01)

(52) U.S. Cl. .................. 455/69; 455/67.11; 455/67.14; 455/68; 455/126; 455/333

(58) Field of Classification Search ............. 455/67.14, 455/67.4, 69, 226.1, 91, 422, 423, 73, 226.2–226.4, 455/126, 67.11, 67.13, 68, 70, 227, 115.1, 455/114.3, 292.1, 333, 334; 375/296, 346
See application file for complete search history.

(56) References Cited

U.S. PATENT DOCUMENTS

| | | | | |
|---|---|---|---|---|
| 5,422,889 | A * | 6/1995 | Sevenhans et al. | 370/442 |
| 5,995,541 | A * | 11/1999 | Navid et al. | 375/224 |
| 6,052,386 | A * | 4/2000 | Achilleoudis et al. | 370/470 |
| 6,563,374 | B1 * | 5/2003 | Jaussi et al. | 327/562 |
| 6,608,582 | B2 * | 8/2003 | Casper et al. | 341/155 |
| 6,832,075 | B1 * | 12/2004 | Henry, Jr. | 455/226.1 |
| 6,944,692 | B2 * | 9/2005 | Smith et al. | 710/106 |
| 6,995,627 | B2 * | 2/2006 | Casper et al. | 333/18 |
| 7,019,550 | B2 * | 3/2006 | Wehage et al. | 326/16 |
| 2001/0024477 | A1 * | 9/2001 | Haycock | 375/296 |
| 2002/0009132 | A1 * | 1/2002 | Miller | 375/222 |
| 2003/0174015 | A1 * | 9/2003 | Jaussi et al. | 327/563 |
| 2004/0234010 | A1 * | 11/2004 | Wei et al. | 375/346 |
| 2005/0210308 | A1 * | 9/2005 | Best et al. | 713/503 |
| 2006/0132339 | A1 * | 6/2006 | Alon et al. | 341/120 |

* cited by examiner

*Primary Examiner*—Pablo N. Tran
(74) *Attorney, Agent, or Firm*—LeMoine Patent Services, PLLC

(57) ABSTRACT

A receiver is calibrated using a transmitter that can output a plurality of substantially constant amplitude signals.

7 Claims, 8 Drawing Sheets

US 7,190,931 B2

RECEIVER CALIBRATION APPARATUS, METHOD, AND SYSTEM

FIELD

The present invention relates generally to testing of circuits, and more specifically to the calibration of receivers.

BACKGROUND

Within electronic systems, integrated circuits typically communicate with each other using electrical signals. A typical electrical signal is transmitted by one integrated circuit and received by another integrated circuit. Communications generally take place when a receiver receives the electrical signal and determines the electrical signal's amplitude, either by a direct measurement, or by comparing the amplitude to another signal or reference. If the receiver does not measure the signal's amplitude accurately enough, communications errors may result.

DESCRIPTION OF EMBODIMENTS

Figure 1:
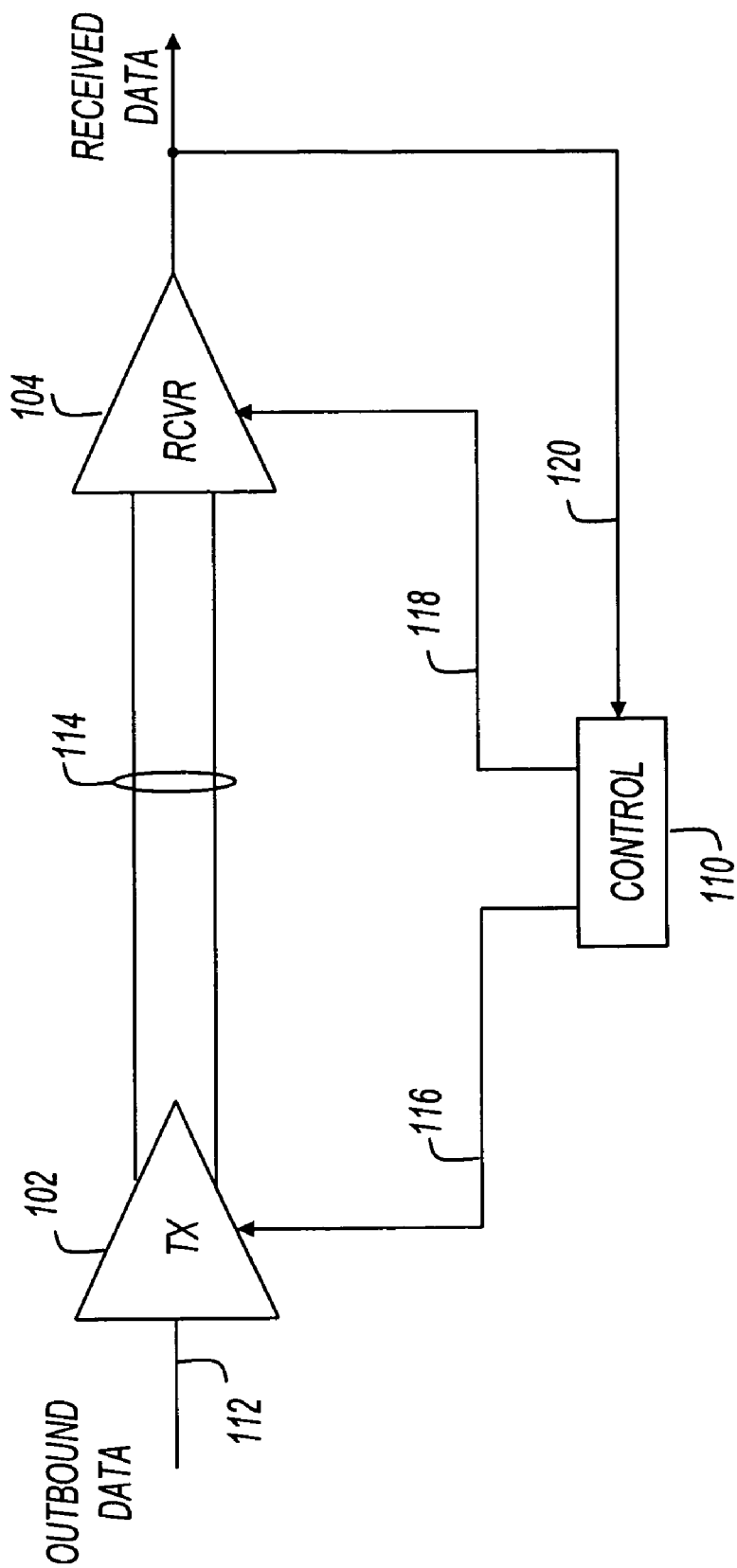
FIG. 1 shows a diagram of a transmitter, a receiver, and a control mechanism.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a diagram of a transmitter, a receiver, and a control mechanism. Transmitter (TX) 102 receives a signal on node 112 and transmits a signal on node 114. Receiver (RCVR) 104 receives the signal on node 114 and transmits a signal on node 120. Control mechanism 110 receives the signal on node 120, and provides control signals to transmitter 102 and receiver 104 on nodes 116 and 118, respectively.

Transmitter 102 may be any type of transmitter adapted to provide a signal on node 114. For example, in some embodiments, transmitter 102 may be a voltage-mode transmitter that transmits a voltage signal, and in other embodiments, transmitter 102 may be a current-mode transmitter that transmits a current-mode signal. Also for example, transmitter 102 may be a single-ended transmitter that transmits a signal on a single physical node, or transmitter 102 may be a differential transmitter that transmits a differential signal on a differential pair of nodes.

Figure 4:
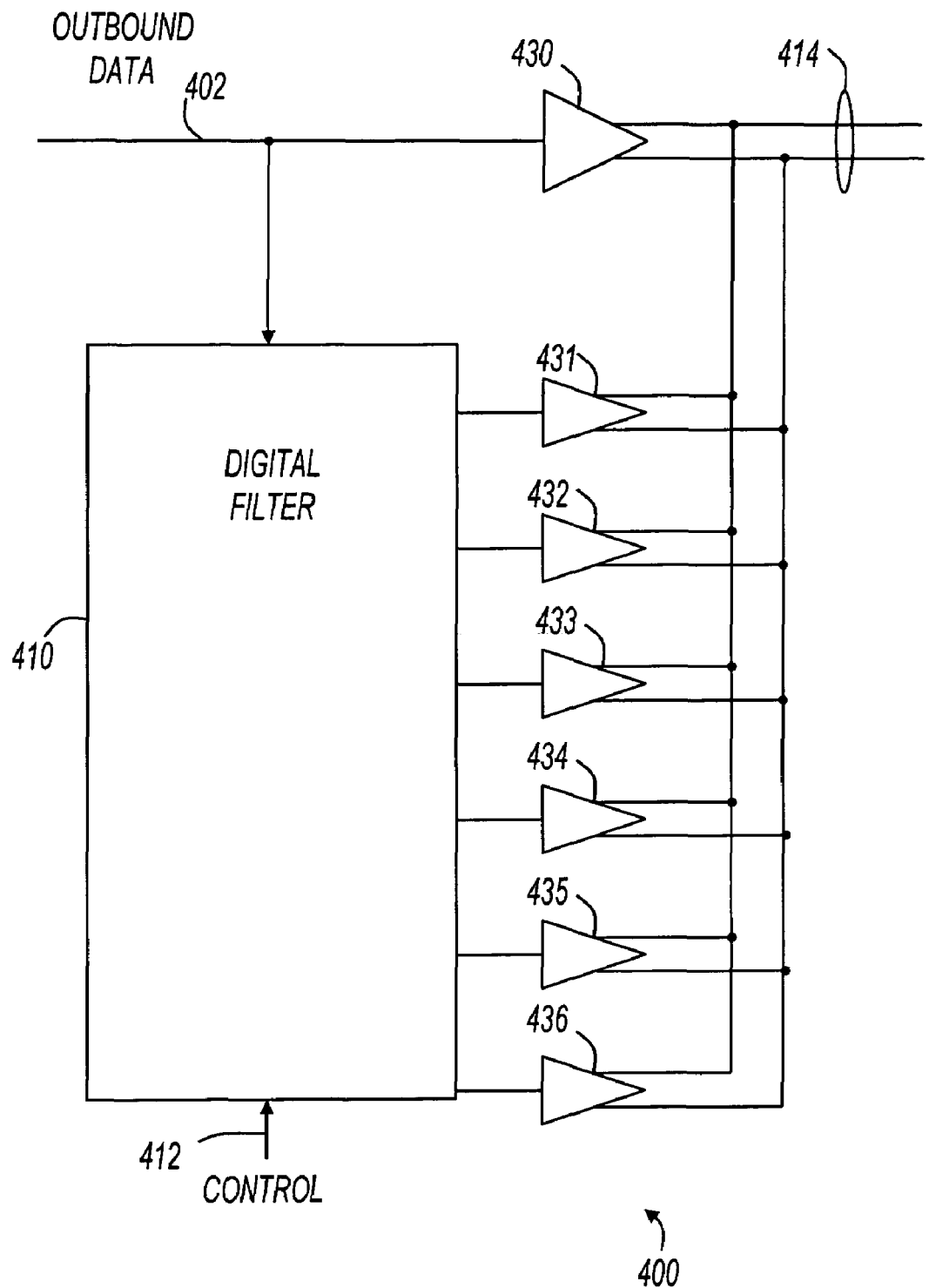
FIG. 4 shows a diagram of transmitter circuit.

In some embodiments, transmitter 102 includes a pre-emphasis circuit. A pre-emphasis circuit may be a circuit that allows a transmitter to modify the amplitude of an output signal to pre-equalize the channel through which the signal travels. Various settings of the pre-emphasis circuit may be used during calibration of receiver 104. An example of a transmitter with a pre-emphasis circuit is shown in FIG. 4.

Receiver 104 may be one of many different types. For example, in some embodiments, receiver 104 includes an amplifier with a single-ended input to receive the input signal on node 114, and a control input to receive a code on node 118 that specifies a threshold voltage. In other embodiments, receiver 104 includes a variable offset comparator with a differential input to receive a differential input signal on node 114. In these embodiments, node 114 includes two conductors to carry a differential signal. Also in these embodiments, the code on node 118 may specify an offset to apply when comparing the signal amplitudes on the differential input. For example, in some embodiments, the signal on node 118 includes a digital word that specifies an offset to be utilized within a variable offset comparator that has a differential input.

Control mechanism 110 receives data on node 120 and provides control information to influence the operation of transmitter 102 and receiver 104. In some embodiments, control mechanism 110 may provide output amplitude control signals to transmitter 102 and may provide threshold control signals to receiver 104. Control mechanism 110 may be implemented in a variety of ways. For example, in some embodiments, control mechanism 110 may be a processor such as a microprocessor or may be a state machine. In some embodiments, control mechanism 110 may be a combination of distributed elements. For example, in some embodiments, the various components of FIG. 1 may be implemented in multiple integrated circuits, and control mechanism 110 may be distributed between these integrated circuits. Also for example, transmitter 102 and receiver 104 may be implemented on a single integrated circuit, and control mechanism 110 may be implemented completely or partially on the integrated circuit. In some embodiments of the present invention, control mechanism 110 includes a scan chain of registers that may be accessed during testing or at other times.

In some embodiments, control mechanism 110 includes a memory-mapped interface to allow an external device to access the capabilities of control mechanism 110. For example, embodiments that include a memory-mapped interface may allow an external device to influence the operation of transmitter 102 and receiver 104 using control signals sourced by control mechanism 110. Also for example, embodiments that include a memory-mapped interface may also allow an external device to retrieve information from control mechanism 110.

The various embodiments of the present invention as represented in FIG. 1 may operate in one of two modes: an "operational" mode, and a "calibration" mode. In operational mode, transmitter 102 receives outbound data from node 112 and transmits data on node 114. Outbound data on node 112 may be supplied from any source. For example, in some embodiments, transmitter 102 may be part of an integrated circuit, and outbound data on node 112 may be generated within the integrated circuit. Also in operational mode, receiver 104 receives the data on node 114, and produces received data on node 120. Received data on node 120 may be provided to any type of circuit, as indicated by the arrow at the right of node 120.

In some embodiments of operational mode, control mechanism 110 may provide a pre-emphasis setting to transmitter 102. Transmitter 102 may receive the pre-emphasis setting and apply pre-emphasis to the signal sourced onto node 114. In other embodiments, control mechanism 110 may place transmitter 102 into operational mode without specifying a pre-emphasis setting. Also in operational mode, control mechanism 110 may provide a threshold value or offset code to receiver 104. Control mechanism 110 may use information gathered in calibration mode (described below) to determine the appropriate offset value for operational mode.

Operational mode may be used when transmitter 102 and receiver 104 are performing normal functions as part of an electronic system. For example, receiver 102 may be part of an integrated circuit such as a microprocessor, and receiver 104 may be part of an integrated circuit such as a peripheral device coupled to the microprocessor, where both are part of a computer system. Operational mode may be used when the computer is operating normally, and the microprocessor is transmitting data to the peripheral device as part of the normal computer operation.

In calibration mode, the combination of transmitter 102, receiver 104, and control mechanism 110 work to calibrate receiver 104. In some embodiments, the calibration produces a table of values for threshold voltage versus offset code for receiver 104. For example, in some embodiments, when in calibration mode, transmitter 102 provides a substantially constant amplitude direct current (DC) signal, and control mechanism 110 determines the offset code at which the receiver output changes state. This may be repeated for multiple signal amplitudes and offset codes. In some embodiments, control mechanism 110 causes transmitter 102 to output different amplitude signals by utilizing a pre-emphasis circuit within transmitter 102. In these embodiments, the various pre-emphasis settings may be set in sequence, and the offset code corresponding to each may be found.

Figure 2:
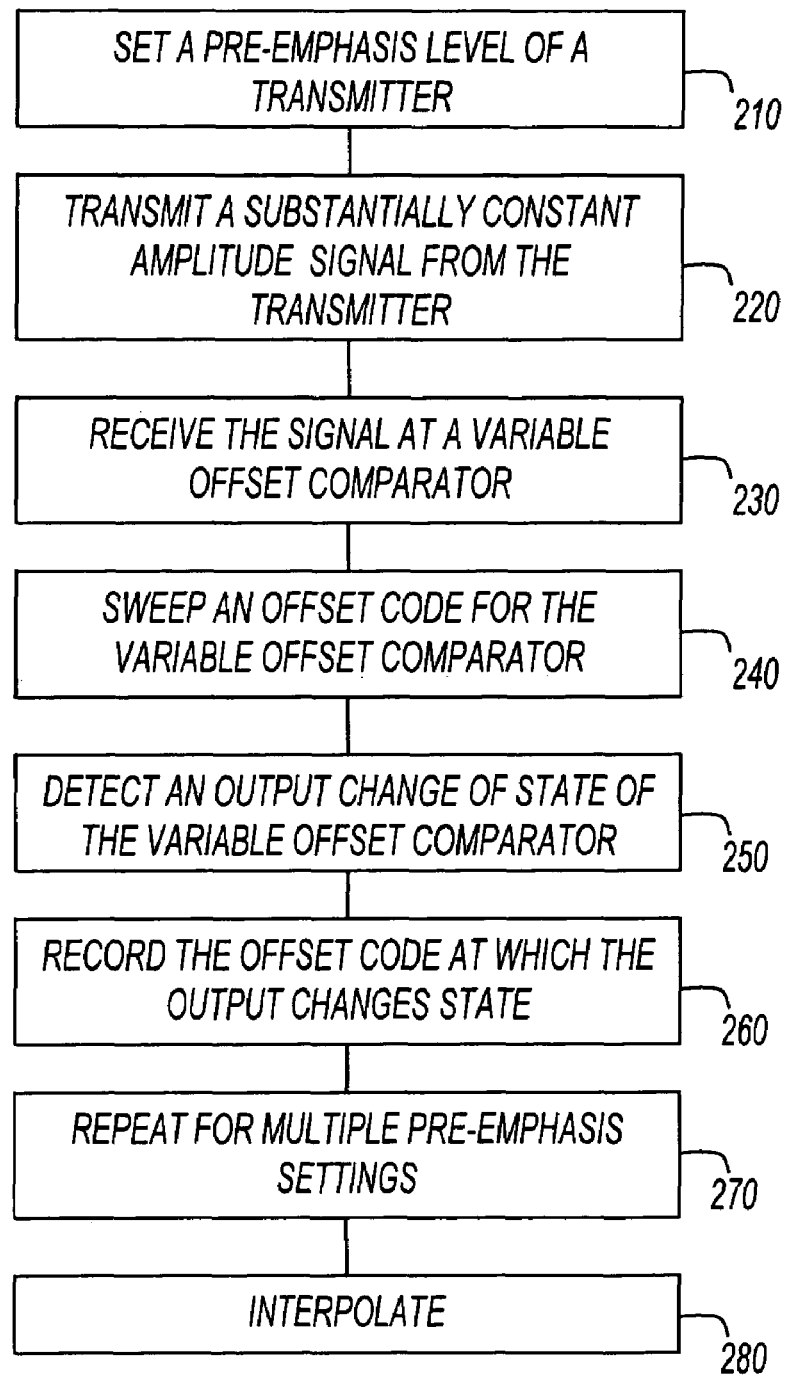
FIG. 2 shows a flowchart in accordance with various embodiments of the present invention.

FIG. 2 shows a flowchart in accordance with various embodiments of the present invention. In some embodiments, method 200 may be used to calibrate a receiver. In some embodiments, method 200, or portions thereof, is performed by a processor or electronic system embodiments of which are shown in the various figures. In other embodiments, method 200 is performed as part of a wafer level test or a system test. Method 200 is not limited by the particular type of apparatus, software element, or person performing the method. The various actions in method 200 may be performed in the order presented, or may be performed in a different order. Further, in some embodiments, some actions listed in FIG. 2 are omitted from method 200.

Method 200 is shown beginning at block 210 in which a pre-emphasis level of a transmitter is set. At 220, a substantially constant amplitude signal is transmitted from the transmitter. Referring now back to FIG. 1, control mechanism 110 may provide control information to transmitter 102 to set the pre-emphasis level and to transmit a substantially constant amplitude signal. In some embodiments, the "pre-emphasis level" referred to in block 210 does not correspond exactly to the pre-emphasis levels available during operational mode. Rather, in these embodiments, the "pre-emphasis level" refers to utilizing a pre-emphasis circuit within the transmitter to generate a substantially constant amplitude signal. Various embodiments utilizing a pre-emphasis circuit are discussed below with reference to FIG. 4.

In block 230, the signal is received at a variable offset comparator. The variable offset comparator of block 230 may be part of a receiver that is being calibrated by method 200. For example, referring now back to FIG. 1, receiver 104 may include a variable offset comparator that may be calibrated using method embodiments represented by method 200. In block 240, an offset code for the variable offset comparator is swept, and at 250, an output change of state of the variable offset comparator is detected. In block 260, the offset code at which the output changes state is recorded.

The actions listed in blocks 240, 250, and 260 may be performed by a control mechanism such as control mechanism 10 (FIG. 1). The control mechanism may sweep an offset code provided on node 118 and monitor a digital signal on node 120. When the digital signal on node 120 changes state, the control mechanism may record a data point in a calibration table. The data point may include a signal amplitude value driven by the transmitter, and an offset code corresponding to that signal amplitude value.

Figure 3:
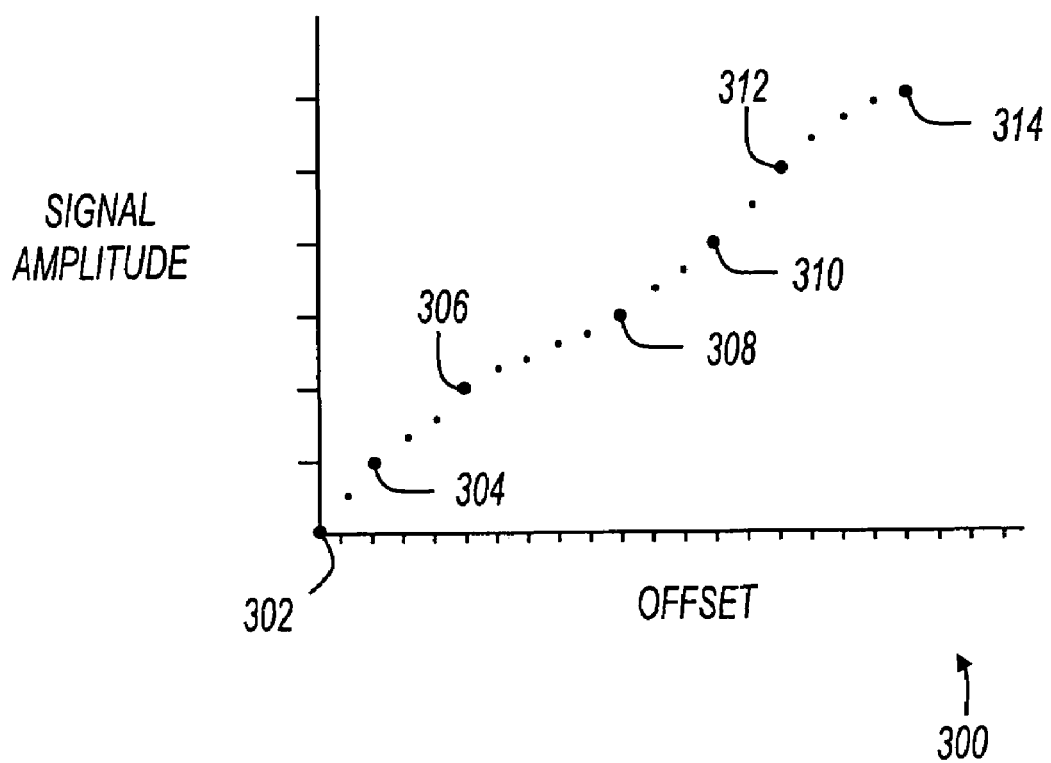
FIG. 3 shows a plot of calibration data.

At 270, the actions listed prior to block 270 are repeated for multiple pre-emphasis settings. This corresponds to the transmitter transmitting multiple signals having known constant amplitude values, and recording offsets that correspond to each known constant amplitude value. The actions of block 270 may produce multiple data points for a calibration table. At 280, interpolation may be performed to estimate data points between the data points in the calibration table provided by block 270. FIG. 3 shows an example graphical representation of data points that may result from performing method 200.

FIG. 3 shows a plot of calibration data. The vertical axis of plot 300 corresponds to a signal amplitude, and the horizontal axis of plot 300 corresponds to an offset code. As described above with reference to FIG. 2, the data in plot 300 may be collected by having a transmitter output a series of substantially constant amplitude signals and then determining an offset code for a variable offset comparator that corresponds to each of the amplitudes. In FIG. 3, seven different signal amplitudes are represented, shown by the markings on the vertical axis. Data points 302, 304, 306, 308, 310, 312, and 314 correspond to data points collected as a result of performing method 200 (FIG. 2). The remaining data points are a result of interpolating between the collected data points. Any type of interpolation or curve-fitting may be performed without departing from the scope of the present invention. For example, in some embodiments, spline or linear interpolation may be used.

The signal amplitude referred to on the vertical axis of plot 300 may refer to a current-mode signal or a voltage-mode signal. For example, in some embodiments that include a voltage-mode transmitter, the vertical axis may refer to a voltage amplitude. Also for example, in some embodiments that include a current-mode transmitter, the vertical axis may refer to a current amplitude. In still further embodiments that include a current-mode transmitter, a termination circuit may be included to provide a voltage at the input to the receiver, and the vertical axis on plot 300 may refer to a voltage at the input to the receiver.

FIG. 4 shows a diagram of a transmitter circuit. Transmitter circuit 400 is an example of a transmitter circuit with pre-emphasis. Transmitter circuit 400 may be used to for calibrating a receiver. For example, transmitter circuit 400 may be utilized as transmitter 102 (FIG. 1). Transmitter circuit 400 includes digital filter 410, and drivers 430–436. Drivers 430–436 each have their output nodes coupled in parallel to drive node 414. Driver 430 drives outbound data from node 402, and drivers 431–436 drive data provided by digital filter 410. In embodiments represented by FIG. 4, transmitter circuit 400 is a current-mode driver. Each of drivers 430–436 drives a differential current on node 414, and the differential currents sum on node 414 to provide the output signal.

In operational mode, driver 430 and digital filter 410 receive the outbound data, and driver 430 transmits the outbound data on node 414. Also in operational mode, digital filter 410 receives control information on node 412 and provides pre-emphasis by driving drivers 431–436 with either outbound data or data produced by digital filter 410. In some embodiments, the amount of pre-emphasis may be controlled by data received on control node 412.

In calibration mode, control information on node 412 may override the normal operation of digital filter 410 to provide varying output signal amplitudes. For example, control information on node 412 may switch multiplexers or other circuit elements within digital filter 410 to select a subset of drivers 431–436 to drive outbound data, and select another subset to drive the complement of the outbound data The number of possible signal amplitude levels available for calibration mode depends on a number of factors, including the number of drivers, the drive strength of the drivers, and the control mechanism employed. For example, in some embodiments, drivers 430–436 have similar drive strengths, and in other embodiments, drivers 430–436 have different drive strengths. In some embodiments, driver 430 has a first drive strength, and drivers 431–436 have a second drive strength which is either above or below the first drive strength. In other embodiments, drivers 431–436 have varying drive strengths. For example, the drive strengths of drivers 431–436 may have a binary relationship.

Figure 5:
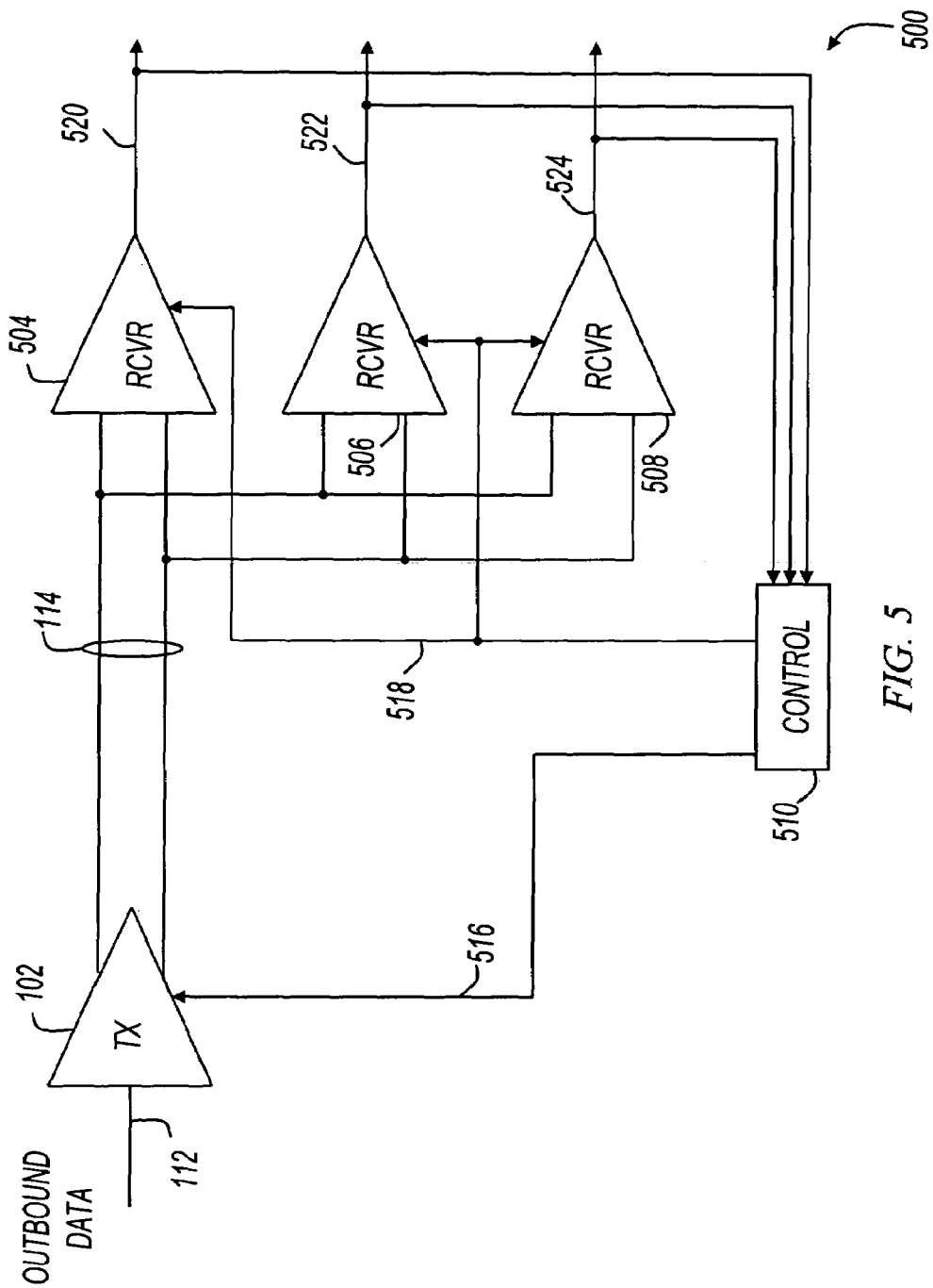
FIG. 5 shows a diagram of a transmitter, a control mechanism, and multiple receivers.

FIG. 5 shows a transmitter, a control mechanism, and multiple receivers. Transmitter (TX) 102 receives a signal on node 112 and transmits a signal on node 114. Receivers (RCVR) 504, 506, and 508 receive the signal on node 114 and transmit signals on nodes 520, 522, and 524, respectively. Control mechanism 510 receives the signals on node 520, 522, and 524, and provides control signals to transmitter 102 on node 516, and receivers 504, 506, and 508 on node 518.

Transmitter 102 is described above with reference to FIG. 1. In some embodiments, transmitter 102 includes a pre-emphasis circuit. For example, transmitter 102 may be implemented with one of the embodiments represented by FIG. 4.

Receivers 504, 506, and 508 are coupled in parallel. In some embodiments, each of receivers 504, 506, and 508 are set to operate with a different threshold to implement a multi-level signaling scheme such as four level pulse amplitude modulation (4PAM). In some embodiments, fewer than three receivers are coupled in parallel, and in other embodiments, more than three receivers are coupled in parallel.

Control mechanism 510 receives data on nodes 520, 522, and 524, and provides control information to influence the operation of transmitter 102 and receivers 504, 506, and 508. In some embodiments, control mechanism 510 may provide output amplitude control signals to transmitter 102 and may provide threshold control signals to receivers 504, 506, and 508. Control mechanism 510 may be implemented in a variety of ways. For example, in some embodiments, control mechanism 510 may be a processor such as a microprocessor or may be a state machine. In some embodiments, control mechanism 510 may be a combination of distributed elements. For example, in some embodiments, the various components of FIG. 5 may be implemented in multiple integrated circuits, and control mechanism 510 may be distributed between these integrated circuits. Also for example, transmitter 102 and receivers 504, 506, and 508 may be implemented on a single integrated circuit, and control mechanism 510 may be implemented completely or partially on the integrated circuit. In some embodiments of the present invention, control mechanism 510 includes a scan chain of registers that may be accessed during testing.

In some embodiments, control mechanism 510 includes a memory-mapped interface to allow an external device to access the capabilities of control mechanism 510. For example, embodiments that include a memory-mapped interface may allow an external device to influence the operation of transmitter 102 and receivers 504, 506, and 508 using control signals sourced by control mechanism 510. Also for example, embodiments that include a memory-mapped interface may also allow an external device to retrieve information from control mechanism 510.

In some embodiments, each of receivers 504, 506, and 508 are calibrated using methods previously described. For example, in some embodiments, receivers 504, 506, and 508 include variable offset comparators, and the variable offset comparators are calibrated by having transmitter 102 output substantially constant amplitude signals, sweeping the offset codes provided on node 518, and monitoring signals on nodes 520, 522, and 524.

Figure 6:
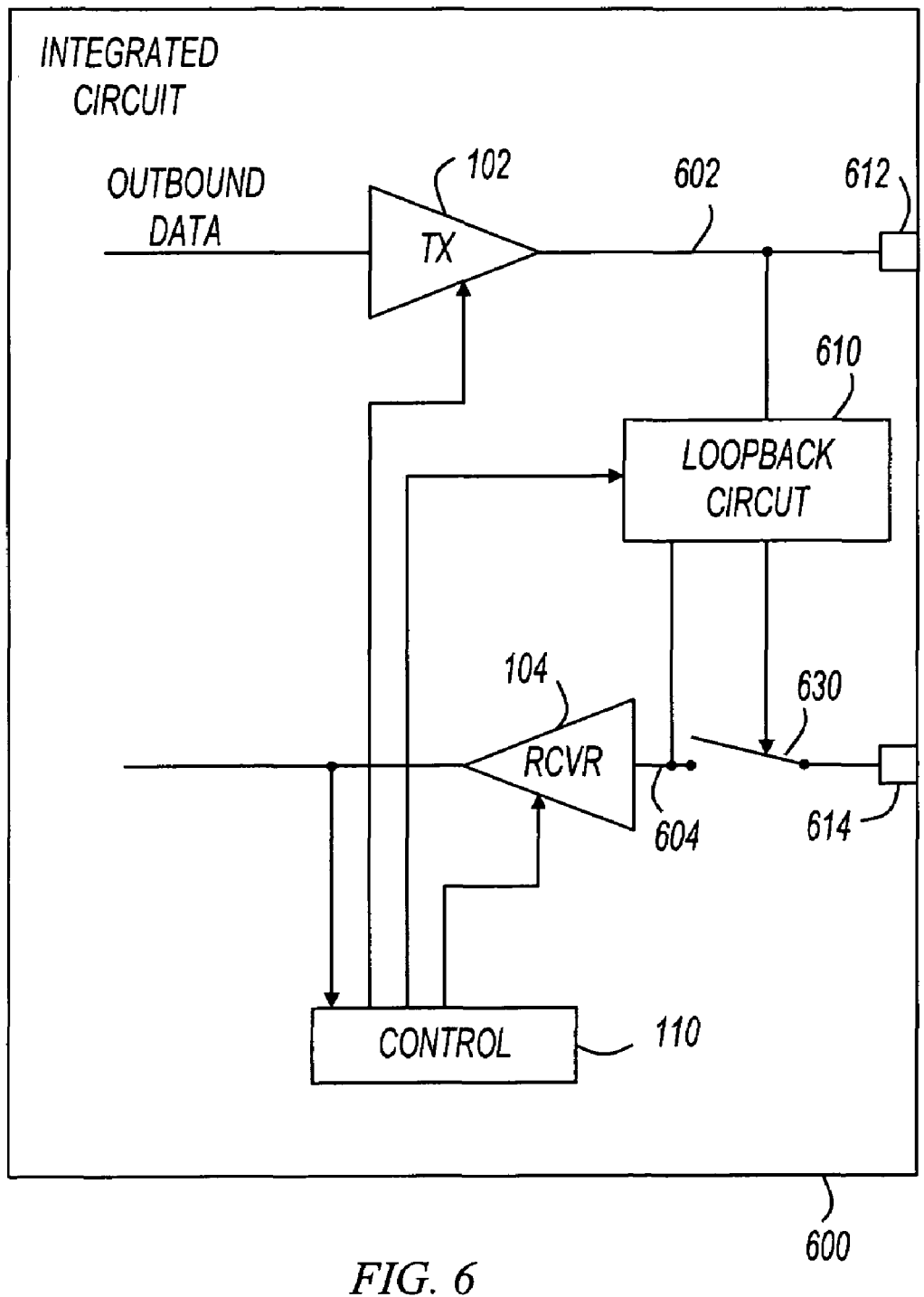
FIG. 6 shows a diagram of an integrated circuit.

FIG. 6 shows a diagram of an integrated circuit. Integrated circuit 600 includes transmitter 102, receiver 104, control mechanism 110, and loopback circuit 610. Transmitter 102, receiver 104, and control mechanism 110 are described above with reference to previous figures. As shown in FIG. 6, transmitter 102 drives a signal on node 602 which leaves integrated circuit at pad 612. Also as shown in FIG. 6, receiver 104 receives a signal on node 604 which is received by integrated circuit 600 at pad 614. Loopback circuit 610 conditionally couples node 602 and node 604 in response to control signals received from control mechanism 110. Loopback circuit 610 also controls switch 630 to conditionally isolate pad 614 and node 604.

In some embodiments, control mechanism 110 may calibrate receiver 104 at various times. For example, when integrated circuit 600 is powered on or is reset, control mechanism 110 may calibrate receiver 104. Also for example, control mechanism 110 may calibrate receiver 104 as part of an initial device test. In some embodiments, if the initial device test fails, the integrated circuit may be discarded.

Integrated circuit 600 is shown with a single transmitter and a single receiver. In some embodiments, many more transmitters and receivers are included in integrated circuit 600. For example, many transmitter/receiver pairs may be combined to form a large interface to communicate with a bus in a computer system. The number of transmitters and receivers is not a limitation of the present invention.

Figure 7:
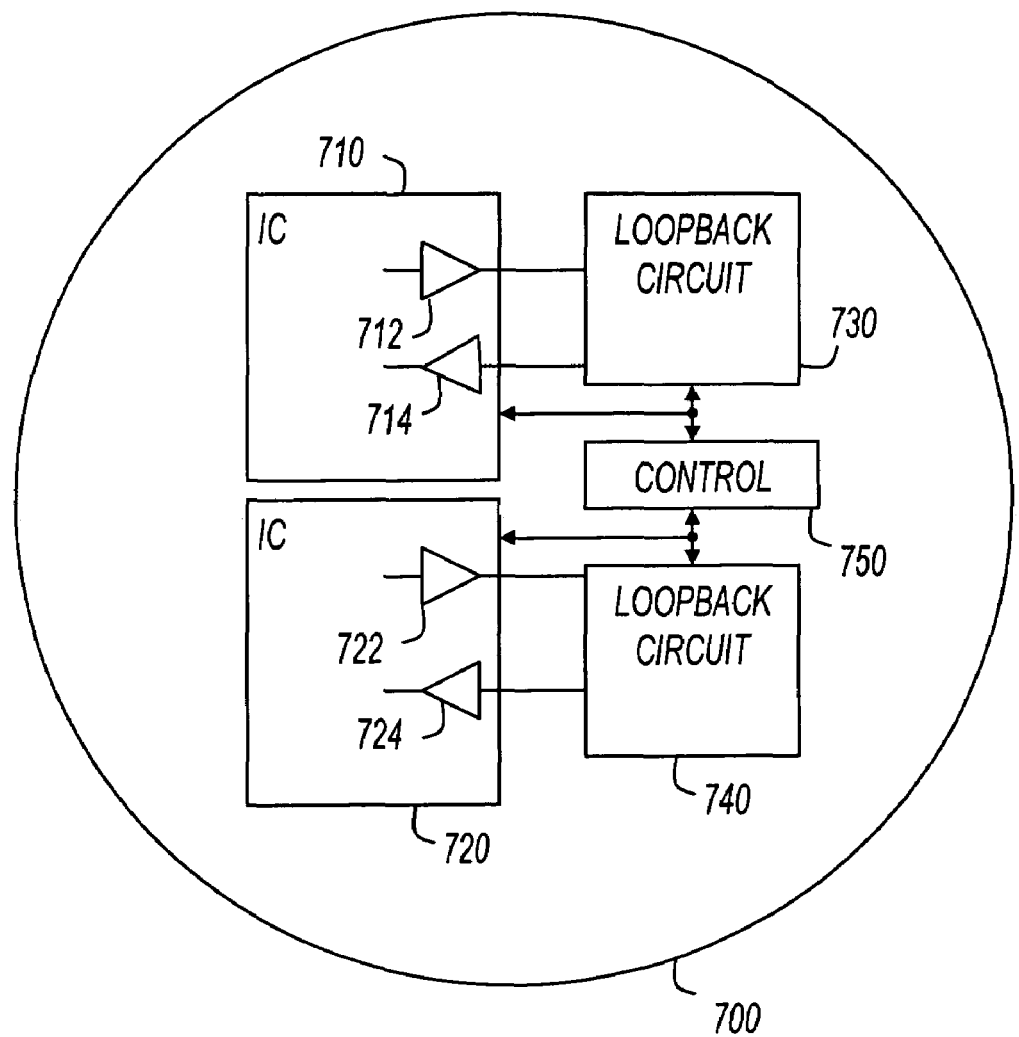
FIG. 7 shows a diagram of a semiconductor wafer.

FIG. 7 shows a diagram of a semiconductor wafer. Semiconductor wafer 700 includes integrated circuit dice (ICs) 710 and 720, loopback circuits 730 and 740, and control mechanism 750. Semiconductor wafer 700 may include many more integrated circuit dice, loopback circuits, or control mechanisms without departing from the scope of the present invention. Integrated circuit die 710 includes transmitter 712 and receiver 714, and integrated circuit die 720 includes transmitter 722 and receiver 724. As shown in FIG. 7, loopback circuits 730 and 740 and control mechanism 750 are included on semiconductor wafer but not on integrated circuit die 710. In some embodiments, the combination of control mechanism 750 and loopback circuit 730 calibrate receiver 714. Likewise, in some embodiments, the combination of control mechanism 750 and loopback circuit 740 calibrate receiver 724.

Transmitters 712 and 722 may be a transmitter capable of transmitting a substantially constant amplitude signal. For example transmitters 712 and 722 may be implemented with transmitter 400 (FIG. 4), or any other type of transmitter referred to herein. Receivers 714 and 724 may be any type of receiver referred to herein. For example, receivers 714 and 724 may include variable offset comparators.

Loopback circuits 730 and 740 communicate with integrated circuit dice 710 and 720 using signal traces that are partially on the integrated circuit dice, and partially off the integrated circuit dice. In some embodiments, portions of loopback circuits 730 and 740 are on the integrated circuit dice. For example, registers that hold offset code values for receiver 714 may be on integrated circuit die 710. Further, control circuits that influence pre-emphasis settings for transmitter 712 may be on integrated circuit die 710.

In some embodiments, the various circuit elements shown in FIG. 7 are utilized to test and calibrate receiver circuits. For example, a method such as method 200 (FIG. 2) may be performed as part of a wafer level test. Integrated circuits that include receivers that fail the wafer level test may discarded.

Figure 8:
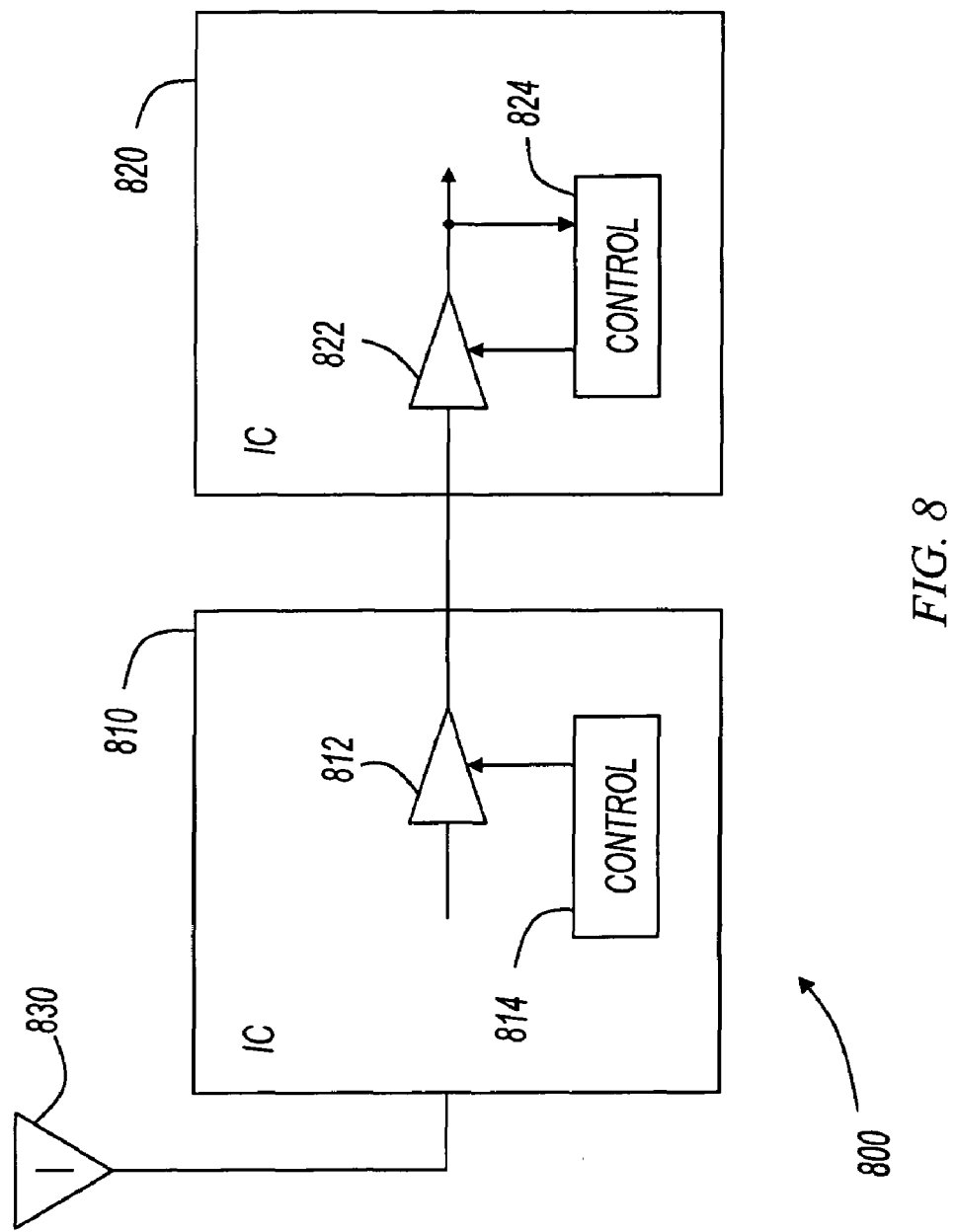
FIG. 8 shows a system diagram in accordance with various embodiments of the present invention.

FIG. 8 shows a system diagram in accordance with various embodiments of the present invention. FIG. 8 shows system 800 including integrated circuits 810 and 820, and antenna 830. In operation, system 800 receives a signal using antenna 830, and the signal is processed by the various elements shown in FIG. 8. Antenna 830 may be a directional antenna or an omni-directional antenna. As used herein, the term omni-directional antenna refers to any antenna having a substantially uniform pattern in at least one plane. For example, in some embodiments, antenna 830 may be an omni-directional antenna such as a dipole antenna, or a quarter wave antenna. Also for example, in some embodiments, antenna 830 may be a directional antenna such as a parabolic dish antenna or a Yagi antenna.

Integrated circuit 810 includes transmitter 812, and integrated circuit 820 includes receiver 822. Transmitter 812 may be a transmitter capable of transmitting a substantially constant amplitude signal. For example transmitter 812 may be implemented with transmitter 400 (FIG. 4), or any other type of transmitter referred to herein. Receiver 822 may be any type of receiver referred to herein. For example, receiver 822 may include a variable offset comparator.

Integrated circuits 810 and 820 also include control mechanisms 814 and 824, respectively. In some embodiments, the various circuit elements shown in FIG. 8 are utilized to test and calibrate receiver 822. For example, a method such as method 200 (FIG. 2) may be performed as part of a system test. System tests may be performed at various times. For example, a system test may be performed when power is applied, or after a system reset.

Integrated circuit 810 is shown with a single transmitter and integrated circuit 820 is shown with a single receiver. In some embodiments, many more transmitters and receivers are included in integrated circuits 810 and 820. For example, many transmitter/receiver pairs may be combined to form a large interface to communicate with a bus in a computer system. The number of transmitters and receivers is not a limitation of the present invention.

Integrated circuits 810 and 820 can be any type of integrated circuit capable of including one or more transmitter or receiver as shown. For example, either integrated circuit 810 or 820 can be a processor such as a microprocessor, a digital signal processor, a microcontroller, or the like. Either integrated circuit can also be an integrated circuit other than a processor such as a radio frequency (RF) receiver, transmitter, or transceiver, an application-specific integrated circuit (ASIC), a communications device, a memory controller, or a memory such as a dynamic random access memory (DRAM). For ease of illustration, portions of integrated circuits 810 and 820 are not shown. The integrated circuits may include much more circuitry than illustrated in FIG. 8 without departing from the scope of the present invention.

Some embodiments include an RF receiver, transmitter, or transceiver coupled between antenna 830 and integrated circuit 810. For example, in some embodiments, an RF receiver receives the signal and performs "front end" processing such as low noise amplification (LNA), filtering, frequency conversion or the like. The invention is not limited by the contents or function of receiver front end 104.

Systems represented by the various foregoing figures can be of any type. Examples of represented systems include computers (e.g., desktops, laptops, handhelds, servers, tablets, web appliances, routers, etc.), wireless communications devices (e.g., cellular phones, cordless phones, pagers, personal digital assistants, etc.), computer-related peripherals (e.g., printers, scanners, monitors, etc.), entertainment devices (e.g., televisions, radios, stereos, tape and compact disc players, video cassette recorders, camcorders, digital cameras, MP3 (Motion Picture Experts Group, Audio Layer 3) players, video games, watches, etc.), and the like.

Transmitter circuits, receiver circuits, control mechanisms, and other embodiments of the present invention can be implemented in many ways. In some embodiments, they are implemented in integrated circuits as part of data busses. In some embodiments, design descriptions of the various embodiments of the present invention are included in libraries that enable designers to include them in custom or semi-custom designs. For example, any of the disclosed embodiments can be implemented in a synthesizable hardware design language, such as VHDL or Verilog, and distributed to designers for inclusion in standard cell designs, gate arrays, or the like. Likewise, any embodiment of the present invention can also be represented as a hard macro targeted to a specific manufacturing process.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A semiconductor wafer comprising:
   a plurality of integrated circuits, each of the plurality if integrated circuits including a transmitter that includes a digital filter and a pre-emphasis circuit to output a plurality of substantially constant signal levels, and a receiver circuit that includes a variable offset comparator to receive the plurality of substantially constant signal levels;

a control mechanism coupled to the receiver, the control mechanism to calibrate the receiver; and a plurality of loopback circuits to couple the transmitter to the receiver of each integrated circuit, wherein the plurality of loopback circuits are situated on the semiconductor wafer and off the plurality of integrated circuits.

2. The semiconductor wafer of claim 1 wherein the receiver circuit comprises a plurality of variable offset comparators coupled in parallel.

3. An integrated circuit comprising:

a transmitter circuit having a pre-emphasis circuit, the transmitter circuit being coupled to drive an output signal off the integrated circuit;

a receiver circuit coupled to receive an input signal from off the integrated circuit, the receiver circuit including a variable offset comparator;

a loopback circuit to conditionally couple an output node of the transmitter circuit to an input node of the receiver circuit; and a control mechanism to calibrate the receiver circuit by causing the transmitter circuit to drive a plurality of substantially constant signal levels, causing the loopback circuit to provide the plurality of substantially constant amplitude signals to the receiver circuit, and to cause the receiver circuit to measure offsets.

4. The integrated circuit of claim 3 wherein the control mechanism comprises a processor.

5. The integrated circuit of claim 3 wherein the control mechanism comprises a state machine.

6. The integrated circuit of claim 3 wherein the control mechanism is adapted to cause the transmitter circuit to output the substantially constant amplitude signals using the pre-emphasis circuit.

7. The integrated circuit of claim 3 wherein the receiver circuit comprises a plurality of variable offset comparators coupled in parallel.

* * * * *